US005556077A

United States Patent [19]

Braesch et al.

[11] Patent Number: 5,556,077

[45] Date of Patent: * Sep. 17, 1996

[54] AIR LIFTING AND BALANCING UNIT

[75] Inventors: Robert O. Braesch; Peter L. Hong, both of Laurens, Iowa; Thomas A. Mefferd, Murrells Inlet, S.C.; Michael D. Olson, Laurens, Iowa

[73] Assignee: Columbus McKinnon Corporation, Amherst, N.Y.

[ * ] Notice: The term of this patent shall not extend beyond the expiration date of Pat. No. 5,439,200.

[21] Appl. No.: 425,603

[22] Filed: Apr. 20, 1995

Related U.S. Application Data

[63] Continuation of Ser. No. 165,701, Dec. 10, 1993, Pat. No. 5,439,200.

[51] Int. Cl.[6] .............................. B66D 1/48; B66D 1/10; F16D 31/02

[52] U.S. Cl. .......................... 254/267; 254/360; 254/372; 254/378; 254/383; 60/459

[58] Field of Search .................................... 254/360, 267, 254/383, 372, 378, 382, 331, 314, 322, 274, 343; 60/459

[56] References Cited

U.S. PATENT DOCUMENTS

| | | | |
|---|---|---|---|
| 2,879,783 | 3/1959 | Taplin | 137/116.3 |
| 3,260,508 | 7/1966 | Powell | 254/331 |
| 3,286,989 | 11/1966 | Bangerter et al. | 254/331 |
| 3,428,298 | 2/1969 | Powell | 254/331 |
| 3,457,837 | 7/1969 | Powell | 254/331 |
| 3,526,388 | 9/1970 | Geiger et al. | 254/360 |
| 3,656,715 | 4/1972 | Powell | 254/360 X |
| 3,669,411 | 6/1972 | McKendrick | 254/386 |
| 3,675,899 | 7/1972 | McKendrick | 254/386 |
| 3,773,296 | 11/1973 | McKendrick | 254/386 |
| 3,791,627 | 2/1974 | Stone et al. | 254/331 |
| 3,894,476 | 7/1975 | Cobb | 91/6 |
| 4,061,311 | 12/1977 | Yamasaki et al. | 254/331 |
| 4,478,390 | 10/1984 | Knight et al. | 254/360 X |
| 4,500,074 | 2/1985 | Fox et al. | 254/360 X |
| 5,439,200 | 8/1985 | Braesch et al. | 254/267 |

OTHER PUBLICATIONS

Columbus McKinnon Corp. brochure entitled Lodeair, Manual 609–A, p. 13 Dec. 1992 (2 pages).

Zimmerman—Module–Air Series ZA Specifications, p. 7 (Date unknown) (2 pages).

Knigh Industries brochure entitled Lift Balance & Material Handling System (Date unknown) (4 pages).

Zimmerman Handling Systems brochure entitled The Strength Behind Material Handling Technology Mar. 1992 (9 pages).

Knight Industries device shown in attached FIG. 1 (Date unknown) (1 sheet).

*Primary Examiner*—Michael R. Mansen

*Attorney, Agent, or Firm*—Joseph P. Gastel

[57] ABSTRACT

An air lifting and balancing unit including a cylinder, a piston in the cylinder, a ball screw affixed to the piston, a ball nut mounted for rotation on the ball screw, a drum mounted on the ball nut, a chain driven by the drum, and centrifugally actuated brakes mounted on the drum for stopping rotation of the drum when the drum exceeds a predetermined acceleration either due to a loss of load or to a loss of air pressure applied to the piston, and a pneumatic circuit in communication with the cylinder for providing air pressure thereto which applies a force on the piston which is at a substantially constant incremental value in opposition to the force exerted by the load applied to the piston through the chain and the drum and the ball screw regardless of variations in said air pressure to thereby cause the speed of the chain to remain substantially constant.

10 Claims, 8 Drawing Sheets

117'
102
91
114
119'
119'
125
126
124
95
80
92
109
13
100
121
123
122
129
119
120
130
127
131
83
97
117
100

AIR LIFTING AND BALANCING UNIT

This is a continuation of application Ser. No. 08/165,701, filed Dec. 10, 1993, now U.S. Pat. No. 5,439,200, dated Aug. 8, 1995.

BACKGROUND OF THE INVENTION

The present invention relates to an improved air lifting and balancing unit and more particularly to a brake structure and pneumatic control circuit therefor.

By way of background, ball screw type of air lifting and balancing units are known. Briefly, in units of this type pressurized air is supplied to a cylinder to move a piston which acts through a ball screw which, in turn, rotates a ball nut having a drum thereon which in turn lifts a chain or a cable to which a load is attached. If there should be a loss of load from the end of the chain or cable, the latter will whip in an unpredictable manner to possibly cause injury to a workman or equipment. Insofar as known, in the past there was no braking structure associated with an air lifting and balancing unit for braking the drum to prevent the whipping. Additionally, insofar as known, in the past when load lifting was effected by supplying pressurized air at a substantially constant pressure but at a variable volume, the load could be lifted at different speeds by the operator. Thus, the load could be lifted too rapidly or too abruptly, which in the latter two instances could create abrupt shocks to the load or undue stresses to the air balance and to the chain. Also, the speed of lifting fluctuated greatly when there were changes in the supply pressure, which, in turn, often resulted in undesired accelerations of the chain during lifting. To overcome those problems, adjustable needle valves were used to limit the lifting speed, but this caused heavier loads to be lifted too slowly. It is with overcoming the foregoing deficiencies of prior art air balancing and lifting units that the present invention is concerned.

SUMMARY OF THE INVENTION

It iS accordingly one important object of the present invention to provide a brake system for an air lifting and balancing unit which functions immediately on excessive acceleration of a drum in response to a loss of load to tend to avoid the uncontrolled whipping of the unloaded end of the chain.

Another object of the present invention is to provide a drum-braking system which is responsive to excessive acceleration of the drum due to a loss of pressurized air which drives the piston.

Yet another object of the present invention is to provide a pneumatic circuit for a cylinder to cause a piston thereof to move at a substantially constant speed regardless of the variations in air pressure supplied thereto.

A further object of the present invention is to provide an improved pneumatic control circuit for an air lifting and balancing unit which ultimately causes a load to be lifted at a substantially constant speed regardless of variations in air pressure by providing pressurized air to the piston of the air balancing and lifting unit which automatically produces a force which is a predetermined increment over the effective force applied to the opposite side of the piston by the load.

Still another object of the present invention is to provide an improved pneumatic control circuit for an air lifting and balancing unit which provides extremely smooth load lifting both at the start of and during the actual lifting.

A still further object of the present invention is to provide an integrated brake and pneumatic control system for an air lifting and balancing unit wherein the pneumatic circuit maintains the speed of the unit substantially constant in spite of variations in pressure so that accelerations which could otherwise occur due to such variations and which may actuate the brakes are prevented. Other objects and attendant advantages of the present invention will readily be perceived hereafter.

The present invention relates to an air lifting and balancing unit comprising a cylinder, a piston in said cylinder, a ball screw affixed to said piston, a ball nut, means mounting said ball nut for rotation on said ball screw, drum means mounted on said ball nut for moving an elongated member which carries a load, brake means mounted relative to said drum, and means for causing said brake means to stop rotation of said drum when said drum exceeds a predetermined acceleration.

The present invention also relates to an air lifting and balancing unit comprising a cylinder, a piston in said cylinder, a ball screw affixed to said piston, a ball nut, means mounting said ball nut for rotation on said ball screw, a drum mounted on said ball nut for rotation with said ball nut, an elongated member mounted on said drum for carrying a load, and pneumatic circuit means in communication with said cylinder for providing air pressure thereto which applies a force on said piston which is at a substantially constant incremental value over the force exerted by said load applied to said piston through said elongated member and said drum and said ball screw regardless of variations in said air pressure to thereby cause the speed of said elongated member to remain substantially constant.

The present invention also relates to an air lifting and balancing unit comprising a cylinder, a piston in said cylinder, a ball screw affixed to said piston, a ball nut, means mounting said ball nut for rotation on said ball screw, drum means mounted on said ball nut foe rotation with said ball nut, an elongated member mounted on said drum means for carrying a load, brake means mounted relative to said drum means, means for causing said brake means to stop rotation of said drum means when said drum means exceeds a predetermined acceleration, and pneumatic circuit means in communication with said cylinder for providing air pressure thereto to produce a force on said piston which is at a substantially constant incremental value in opposition to the force transmitted by said load to said piston to thereby cause the speed of said piston to remain substantially constant regardless of variations in said air pressure and thereby cause the speed of said elongated member to remain substantially constant.

The present invention also relates to a pneumatic control circuit for controlling the flow of pressurized air to a device having an expandible chamber requiring an increasing supply of said pressurized air at a predetermined pressure as said chamber expands comprising a source of pressurized air, an air relay, first conduit means for effecting communication between said source and said air relay, a device having a piston and an expandible chamber, second conduit means for effecting communication between said air relay and said expandible chamber to drive said piston against a load, third conduit means for effecting communication between said expandible chamber and said air relay, and means within said air relay for cyclically comparing the pressure of air from said third conduit means with the pressure of air from said second conduit means and causing said pressure in said second conduit means to apply a substantially constant force to said piston regardless of variations in pressure at said source.

The present invention also relates to a pneumatic control circuit for controlling the flow of pressurized air to a chamber of a cylinder for driving a piston which is subjected to different loads and wherein said chamber expands as said piston moves said load and for maintaining the speed of said piston at a substantially constant value regardless of variations in pressure of the air supplied to said chamber comprising a source of pressurized air, an air relay, first conduit means for effecting communication between said source and said air relay, a cylinder having an expandible chamber, a piston in said cylinder forming a side of said expandible chamber, second conduit means for effecting communication between said air relay and said expandible chamber, third conduit means for effecting communication between said expandible chamber and said air relay, and means within said air relay for cyclically comparing the pressure of air from said third conduit means with the pressure of air from said second conduit means and causing said pressure in said second conduit means to be maintained at a substantially constant increment over the size of said load to thereby cause said piston to always travel at substantially the same speed regardless of said variations in pressure.

The various aspects of the present invention will be more fully understood when the following portions of the specification are read in conjunction with the accompanying drawings wherein:

DESCRIPTION OF THE PREFERRED EMBODIMENTS

Summarizing in advance, the improved air lifting and balancing unit 10 of the present invention possesses a plurality of improvements which include (1) a braking arrangement which becomes activated automatically when the speed of the drum exceeds a predetermined value, and (2) a pneumatic circuit which provides air pressure to the piston of the drum driving cylinder to produce a force thereon which is at a substantially constant incremental value over the opposing effective force exerted by the load on said piston to thereby cause the speed of the drum to produce a substantially constant lifting speed regardless of variations in said air pressure.

Figure 1:
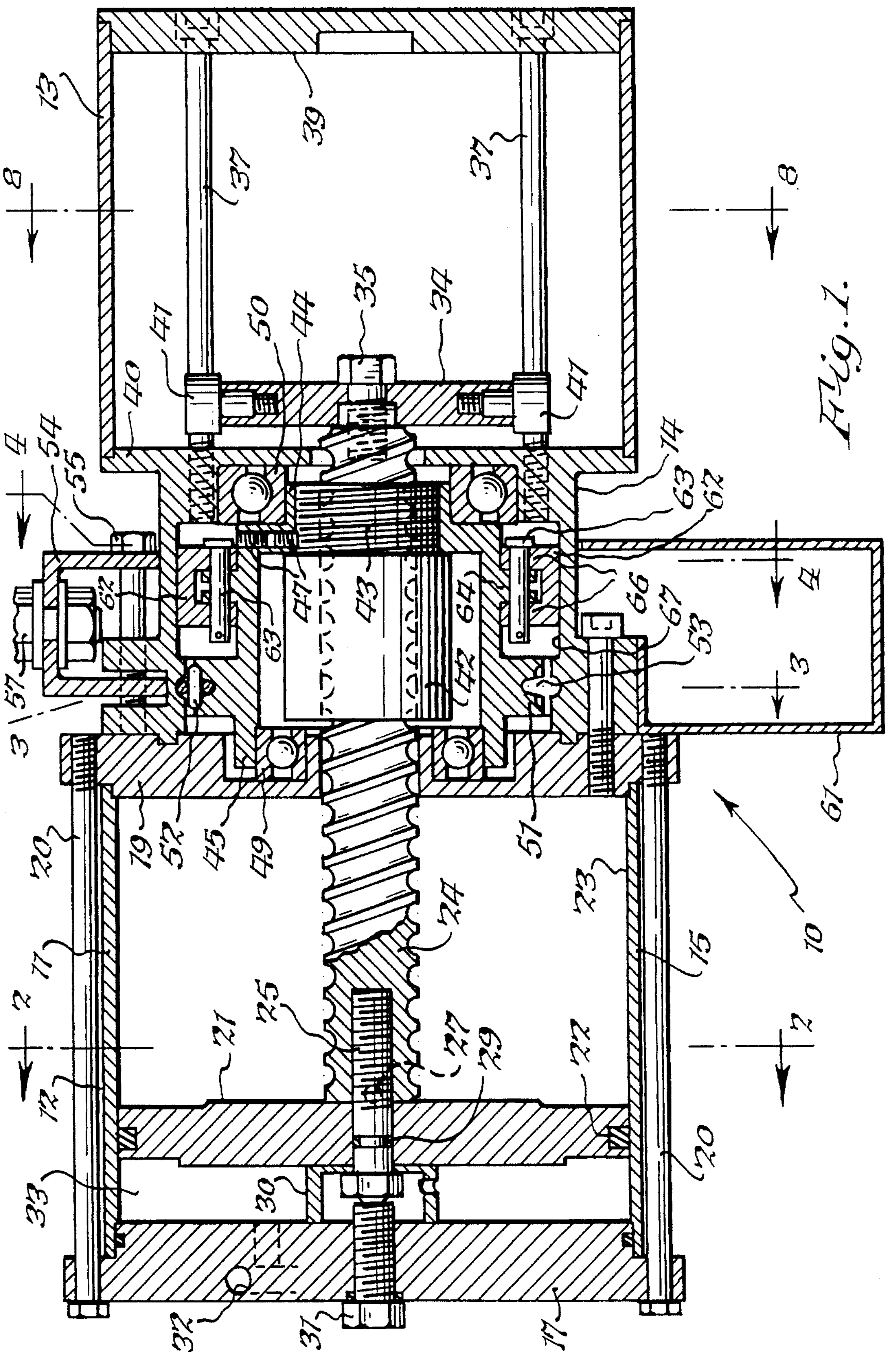
FIG. 1 is a fragmentary cross sectional view taken substantially along line 1—1 of FIG. 2 and showing various components of the air balancer.
Figure 8:
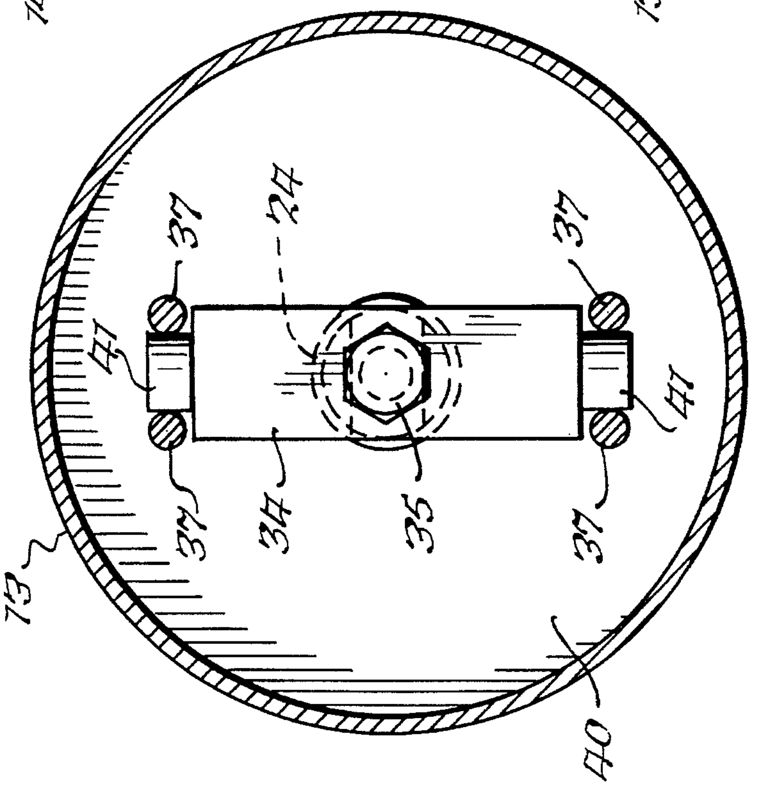
FIG. 8 is a cross sectional view taken substantially along line 8—8 of FIG. 1.
Figure 15:
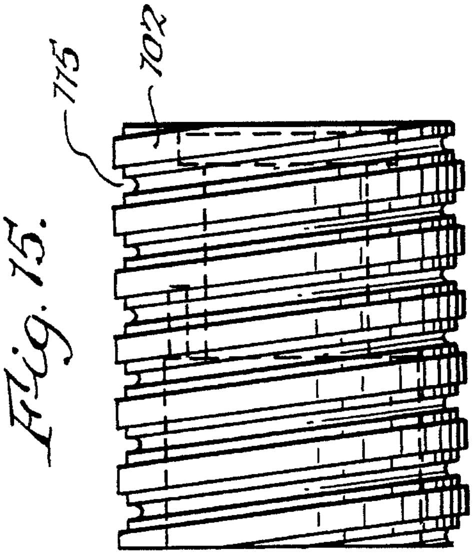
FIG. 15 is a side elevational view of the chain drum of FIG. 11.

The air lifting and balancing unit 10 includes a housing 11 consisting of three housing portions, namely, a cylinder tube 12, an anti-rotation tube 13 and a drum casing 14. The cylinder tube 12 is part of a pneumatic cylinder 15 having a cylinder bottom or end plate 17 secured to a cylinder head 19 by means of a plurality of bolts 20. A cylinder piston 21 has an outer periphery with a seal 22 therein which is in engagement with the inner surface 23 of cylinder tube 12. Piston 21 is secured to the end of ball screw 24 by means of a piston bolt 25 which is secured against rotation relative to ball screw 24 by a set screw 27. An O-ring seal 29 is provided between piston 21 and bolt 25. A piston stop 30 is secured to piston 21 by the head of bolt 25. A bolt 31 extends through cylinder bottom 17 for abutting the head of bolt 25 when the latter is in its leftmost position. A conduit 32 extends through cylinder bottom 17 for conducting pressurized air to and from cylinder chamber 33. The pressurized air moves piston 21 from left to right in FIG. 1 to thereby drive ball screw 24 axially without rotation. The opposite end of ball screw 24 has an anti-rotation bar 34 secured thereto by retaining screw 35 (FIGS. 1 and 8). A plurality of tie rods 37 extend between circular anti-rotation end plate 39 and end wall 40 of casing 14. The anti-rotation mounting tube 13 is secured between anti-rotation end plate 39 and end wall 40. A pair of rollers 41 are mounted at the opposite ends of anti-rotation bar 34 to thus move between the rods 37 and prevent the ball screw from rotating while it moves axially.

Figure 3:
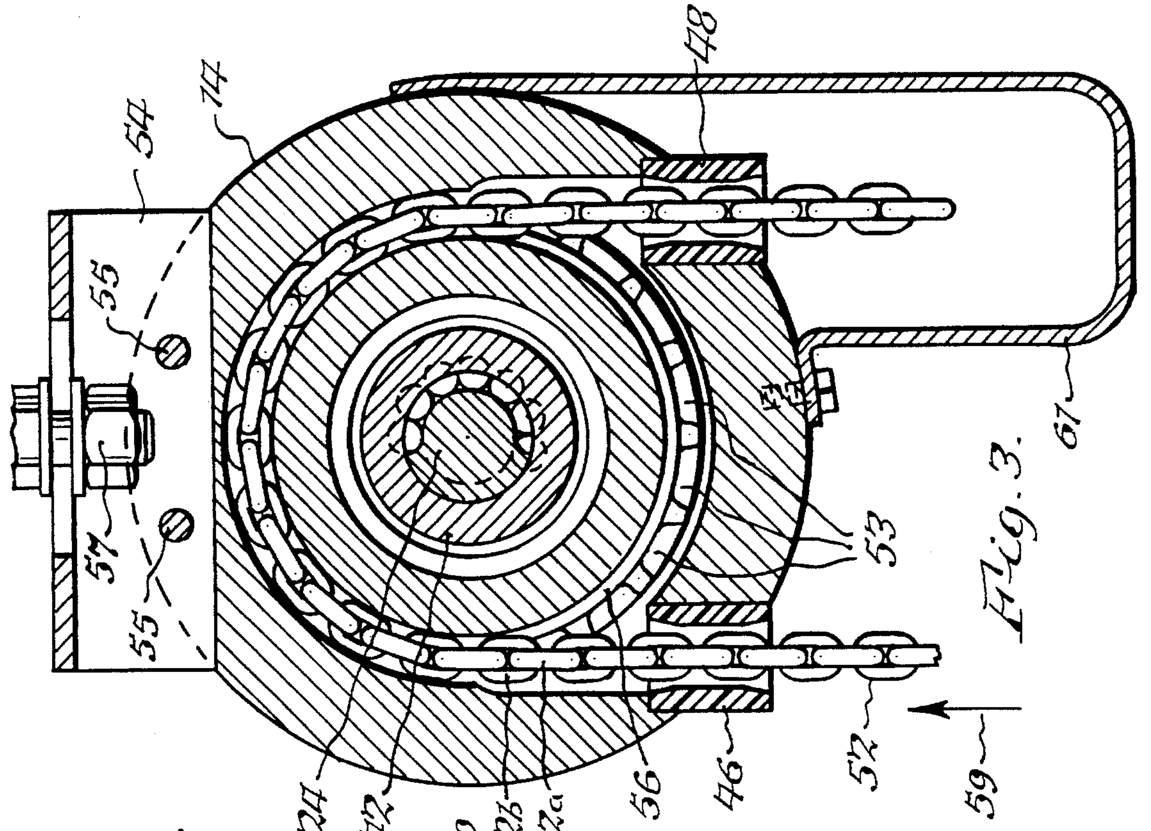
FIG. 3 is a cross sectional view taken substantially along line 3—3 of FIG. 1.
Figure 2:
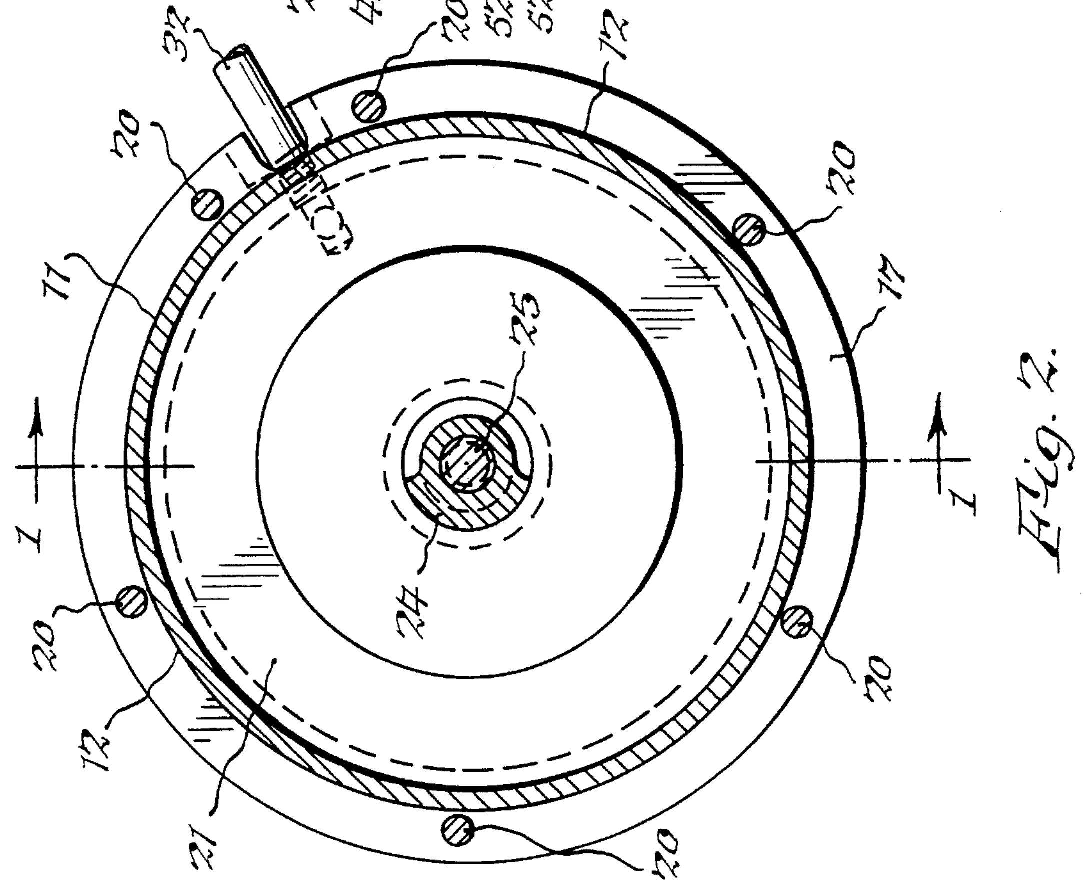
FIG. 2 is a cross sectional view taken substantially along line 2—2 of FIG. 1.
Figure 10:
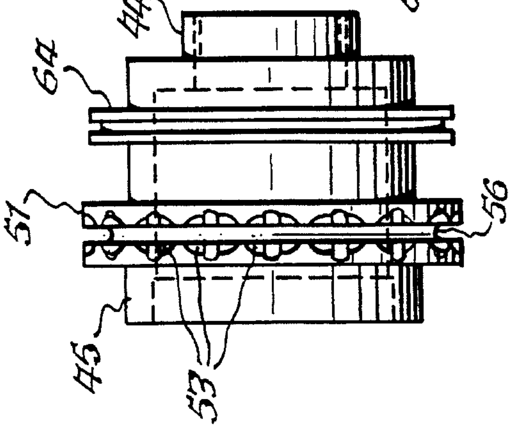
FIG. 10 is a side elevational view of the pocket wheel which is shown in cross section in FIG. 1.

Mounted within casing 14 is a ball screw nut 42 having a threaded end 43 which is threaded into end portion 44 of drum 45 and retained against rotation therein by set screws 47. Drum 45 has one end mounted on the outer race of radial ball bearing 49, the inner race of which is suitably mounted on cylinder head 19. The opposite end of drum 45 is mounted within the inner race of radial and axial bearing 50, the outer race of which is mounted in casing 14 which is provided with wear guides 46 and 48 (FIG. 3). Drum 45 has a pocket wheel 51 formed on the outer periphery thereof for receiving an elongated flexible member in the nature of chain 52. The pocket wheel 51 has pockets 53 (FIGS. 3 and 10) therein which receive chain 52 in the conventional manner. More specifically, links, such as **52*a*, lay flat in the pockets and links 52*b* have edge portions which are received in groove 56 in pocket wheel 51. A bracket 54 is secured to casing 14 by bolts 55, and bracket 54 is to be secured to a suitable support by means of a nut and bolt arrangement 57**.

Figures 4, 5, 6, 7:
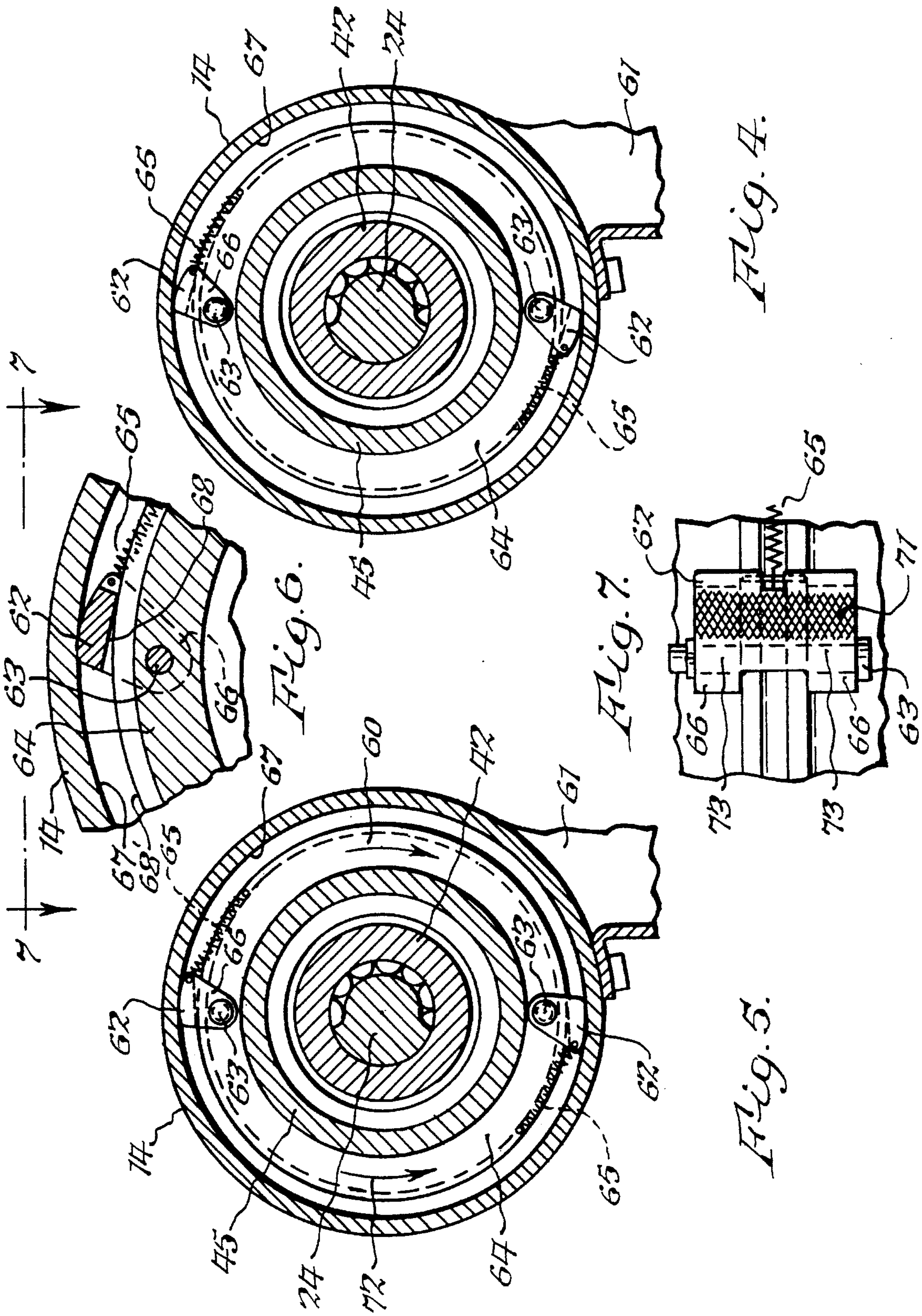
FIG. 4 is a fragmentary cross sectional view taken substantially along line 4—4 of FIG. 1 and showing the brake shoes in a retracted position.
FIG. 5 is a fragmentary cross sectional view similar to FIG. 4 but showing the brake shoes in a braking position.
FIG. 6 is a fragmentary enlarged portion of FIG. 4 showing in greater detail the brake shoe in a retracted position.
FIG. 7 is a fragmentary plan view of the brake shoe taken substantially in the direction of arrows 7—7 of FIG. 6 with the brake drum deleted.

Broadly, in operation, as pressurized air is conducted into chamber 33 from conduit 32, piston 20 will be driven to the right in FIG. 1 to move ball screw 24 axially through ball nut 42 which will thus be caused to rotate because it is held against axial movement within casing 14, and this rotation will cause chain 52 to be moved in the direction of arrow 59 (FIG. 3) as drum 45 moves in a clockwise direction as shown by arrow 60 in FIG. 5. The chain 52 will drop into chain container 61 during clockwise rotation of drum 45.

In accordance with the present invention, brake shoes 62 are pivotally mounted by pins 63 in diametrically opposite positions on rim 64 of drum 45. Pins 63 extend through rim 64 and through ears 66 of brake shoes 62. Brake shoes 62 are normally biased by springs 65 to a retracted position wherein their outer surfaces 71 do not contact the inside surface 67 of casing 14 during rotation of drum 45 at normal speeds. In this respect, a clearance of about 0.020 inches has been found satisfactory. In the retracted position surfaces 68 of the shoes engage the surfaces 68" of rim 64. However, in the event there is a loss of load 69 (FIG. 9) which is held by chain 52, there could be an acceleration of the drum which could result in a whipping action of the outer end 70 of chain 52 when it is permitted to fly at an unreasonably high speed. This could result in injury to a workman or to equipment. Accordingly, if the drum 45 should tend to accelerate beyond a predetermined value, brake shoes 62 will be centrifugally pivoted outwardly about pins 63 from the retracted position of FIGS. 4 and 6 to the extended position of FIG. 5 so that their outer surfaces 71 will engage the inner surface 67 of casing 14 to produce a wedging action between the drum and casing 14 to stop rotation of the drum. The termination of rotation is enhanced by the fact that casing 14 is made out of aluminum whereas brake shoes 62 are made out of steel, which is much harder than aluminum, and outer surfaces 71 are serrated to enhance stopping the rotation by biting into the inner softer surface 67 of casing 14, especially if the coefficient of friction becomes less due to lubrication or other media between the surfaces. The serrations are desired for reliability but are not absolutely necessary for the proper operation.

Figure 4A:
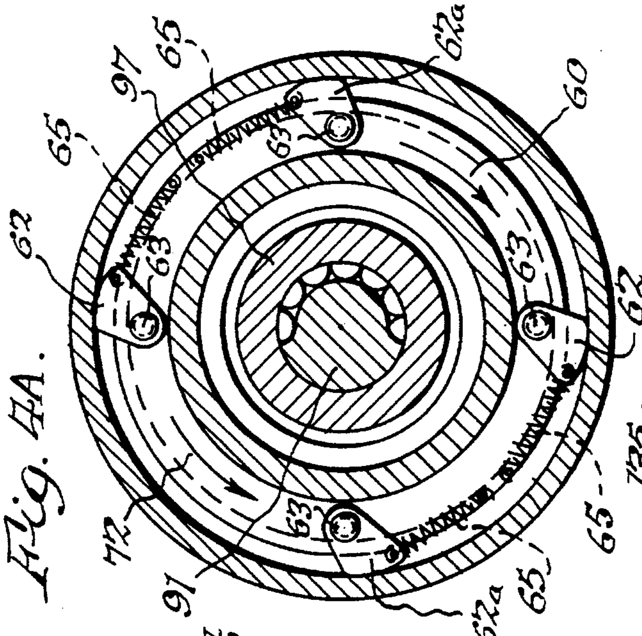
FIG. 4A is a fragmentary cross sectional view similar to FIG. 4 but showing a modified embodiment having two sets of brake shoes which provide braking in opposite directions.

In FIG. 4A an alternate and optional embodiment of the present invention is disclosed wherein, in addition to brake shoes 62 which operate during a loss of load, an additional set of brake shoes **62*a* is provided which are identical in all respects to brake shoes 62 but they are mounted in a reverse direction and are located 90° removed from brake shoes 62. The purpose of brake shoes 62*a* is to effect stopping of drum 45 in the event that it accelerates beyond a predetermined value when the drum turns in the counterclockwise direction of FIG. 5, as depicted by arrow 72, which may occur in the event that there is a sudden loss of air supply to chamber 33 when chain 52 is carrying a load. Under this set of circumstances, brake shoes 62*a* will swing outwardly and wedge and bite into the inner surface 67 of casing 14. It will be appreciated, however, that brake shoes 62 swing out only when excessive acceleration is experienced in the direction of arrow 60 of FIG. 5, and brake shoes 62*a* will swing outwardly when drum 45 experiences excessive acceleration in the direction of arrow 72 of FIG. 5**.

In FIGS. 11–16 alternate embodiments of the present invention are disclosed. The basic difference between the embodiment of FIGS. 1–8 and FIGS. 11–16 is that the drum of FIGS. 1–8 is in the nature of a pocket wheel whereas the drum of the embodiment of FIGS. 11–16 is in the nature of an elongated drum having a helical groove arrangement therein for winding a chain or a cable thereon.

The air lifting and balancing unit 80 of FIGS. 11–16 includes a casing 81 consisting of a cylinder tube 82 and a drum case 83. A circular cylinder end plate 84 is located at one end of cylinder tube 82 and a drum end plate 85 is located at the end of casing 83. A circular rubber cushion pad 86 is mounted against end plate 84. A screw sleeve 87 receives retainer bolt 89 which threads into the end 90 of ball screw 91 which is located in the hollow end 92 of screw sleeve 87. The opposite end 93 of ball screw 91 receives retainer bolt 94 which extends through end plate 85. When bolts 89 and 94 are tightened, cylinder tube 82 and drum case 83 will both be drawn up against the opposite sides of annular center support 95 to maintain the unit 80 in assembled relationship. A ball nut 97 is mounted on ball screw 91. The threaded end 99 of ball nut 97 is threaded into nut sleeve mount 100 and is retained therein by set screw 101. Nut sleeve mount 100 is pinned to drum 102 by anti-rotation dowel pin 103. The end 104 of drum 102 is mounted on one race of thrust bearing 105, the other race of which is mounted on piston 107. Both races of thrust bearing 105 are mounted on hub portion 109 of piston 107. Thus, one end 104 of drum 102 is supported on the hub 109 of piston 107, and the opposite end of drum 104 is mounted on nut sleeve mount 100 which in turn is mounted on ball nut 97.

In operation, compressed air is conducted to and from cylinder chamber 110 through conduit 111 in cylinder end plate 84. When compressed air is permitted to leave chamber 110 and drum 102 is caused to rotate, piston 107 will move to the right because the ball nut will rotate and cause the drum to move axially to the right. The central portion of piston 107 will ride on the outer surface 112 of screw sleeve 87 as drum 102 moves to the right. When piston 107 is located to the right of the position shown in FIG. 11, and compressed air is admitted to chamber 110, piston 107 will move to the left and carry drum 102 with it. In this respect, drum 102 is secured to sleeve mount 100 which is secured to the end 99 of ball nut 97. Thus, as the ball nut 97 is caused to axially traverse ball screw 91, it will rotate and because of the connections between ball nut 97 and drum 102, the latter will also rotate. An elongated flexible member in the nature of chain 114 is received in helical groove 115 of drum 102 (FIG. 15), and the end of chain 114 is secured to drum 102 by means of nut and bolt 113 which passes through nut sleeve mount 100 and drum 102. A bracket 117" is secured by bolts 119" to annular center support 95 for suspending the unit 80 from a suitable support.

In accordance with the present invention, brake shoes 117 are pivotally mounted on diametrically oppositely located pins 119 which extend through annular rim 120 of nut sleeve mount 100 and spaced ears 121 of brake shoe 117. Springs 122 have first ends mounted on pins 123 which extend through ears 121, and the opposite ends of springs 122 are mounted on bolts 124 having nuts 125 which are used to move bolts 124 axially to adjust the tension of springs 122. Nuts 125 bear against shoulders 126 of rim 120. The shoes 117 are identical in all respects to shoes 62 of FIGS. 4–6 and they coact with rim 120 in the same manner as shoes 62 do with rim 68" and they have the same clearance with the inside of casing 83.

Figures 12, 13, 14:
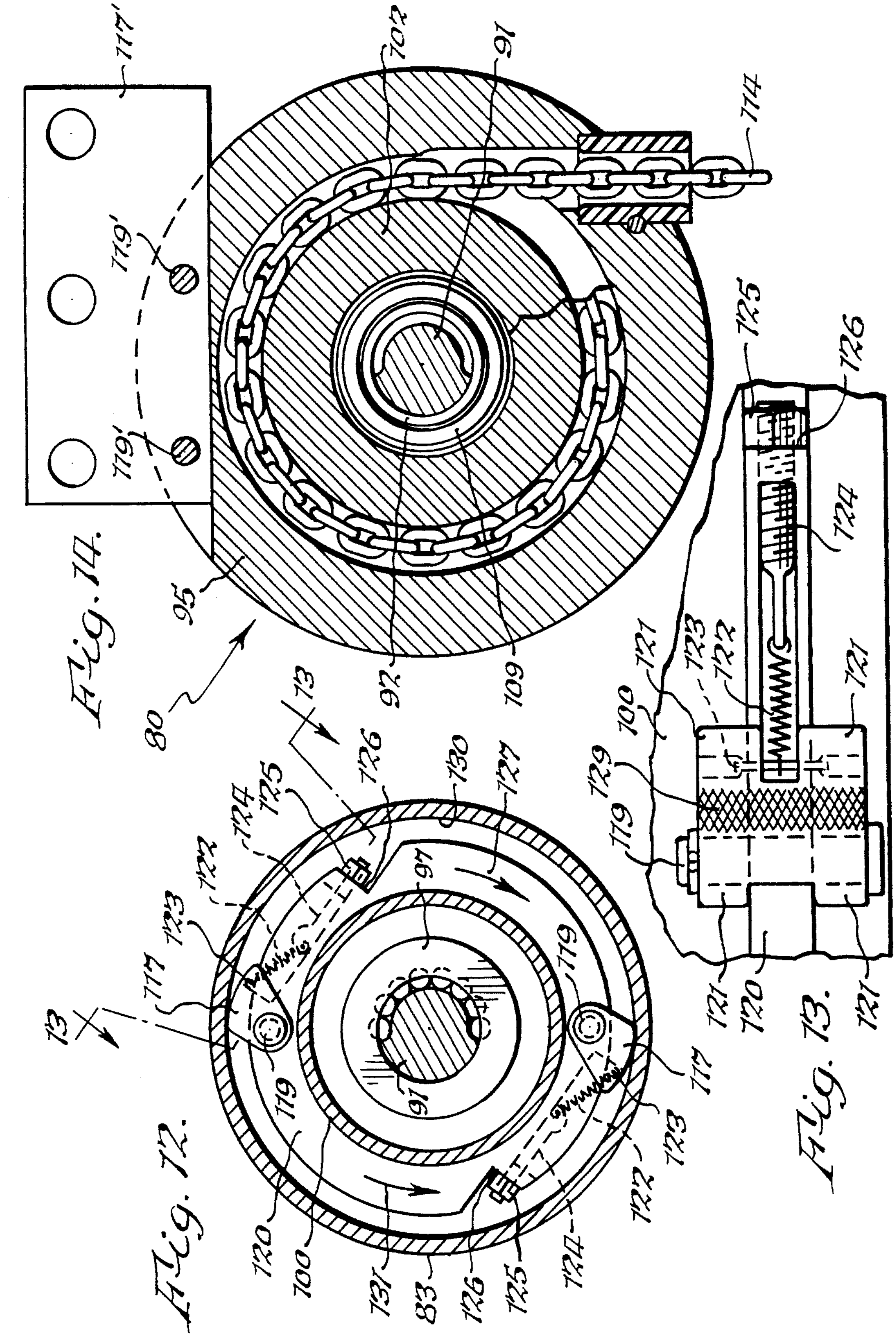
FIG. 12 is a cross sectional view taken substantially along line 12—12 of FIG. 11 and showing the manner in which brake shoes are mounted on the drum assembly.
FIG. 13 is a fragmentary plan view of the brake shoe taken substantially in the direction of arrows 13—13 of FIG. 12 and showing various details of the brake shoe.
FIG. 14 is a fragmentary cross sectional view taken substantially along line 14—14 of FIG. 11.

If the acceleration of nut sleeve mount 100 and rim 120 thereof should exceed a predetermined value in the direction of arrow 127 of FIG. 12, brake shoes 117 will pivot outwardly from their clearance position against the bias of springs 122 so that their knurled surfaces 129 will engage the inner surface 130 of casing 83 to thereby wedge between the drum and the casing to stop the rotation of drum 102 to prevent whipping and sudden retraction of the outer end of chain 114 which carries an attachment device, such as a hook (not shown), which is conventionally mounted at the end of the chain. Optionally, shoes, such as 117, may be mounted in a reverse orientation on rim 120 in positions 90° removed from existing shoes 117 to provide braking in the event that drum 102 exceeds a predetermined acceleration in the direction of arrow 131, as may occur if there is a sudden loss of air supply to chamber 110 when chain 114 is carrying a heavy load. As noted above relative to FIG. 4A, brake shoes for the last-mentioned purpose must be oriented in an opposite orientation than shoes 117 in the manner analogous to shoes 62*a* of FIG. 4A.

Figure 16:
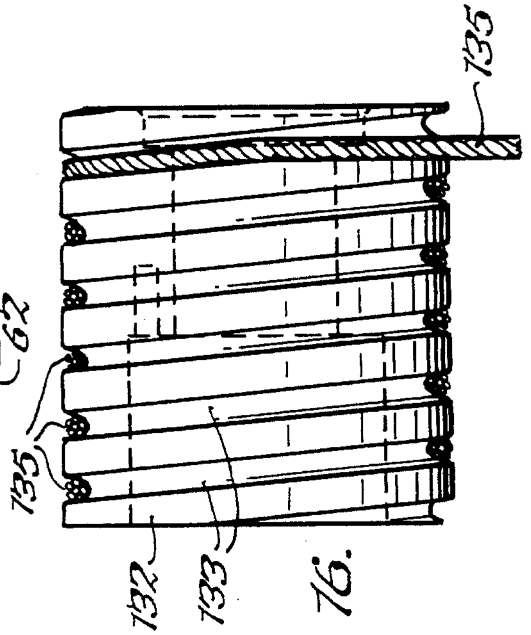
FIG. 16 is a side elevational view of a cable drum which can be used in the embodiment of FIG. 11.

In FIG. 16 a modified embodiment of the drum of FIGS. 11–15 is shown. Drum 132 has the same internal structure as drum 102 of FIGS. 11 and 15, and it fits onto a nut sleeve mount, such as 100 of FIG. 11. The only difference between the drum 102 of FIG. 15 and drum 132 of FIG. 16 is that the helical groove 133 of drum 132 is for receiving an elongated flexible member in the nature of a cable 135 whereas the groove 115 of drum 102 is for receiving a chain. A suitable attachment, not shown, is used to secure the end of the cable to drum 132.

Figure 9:
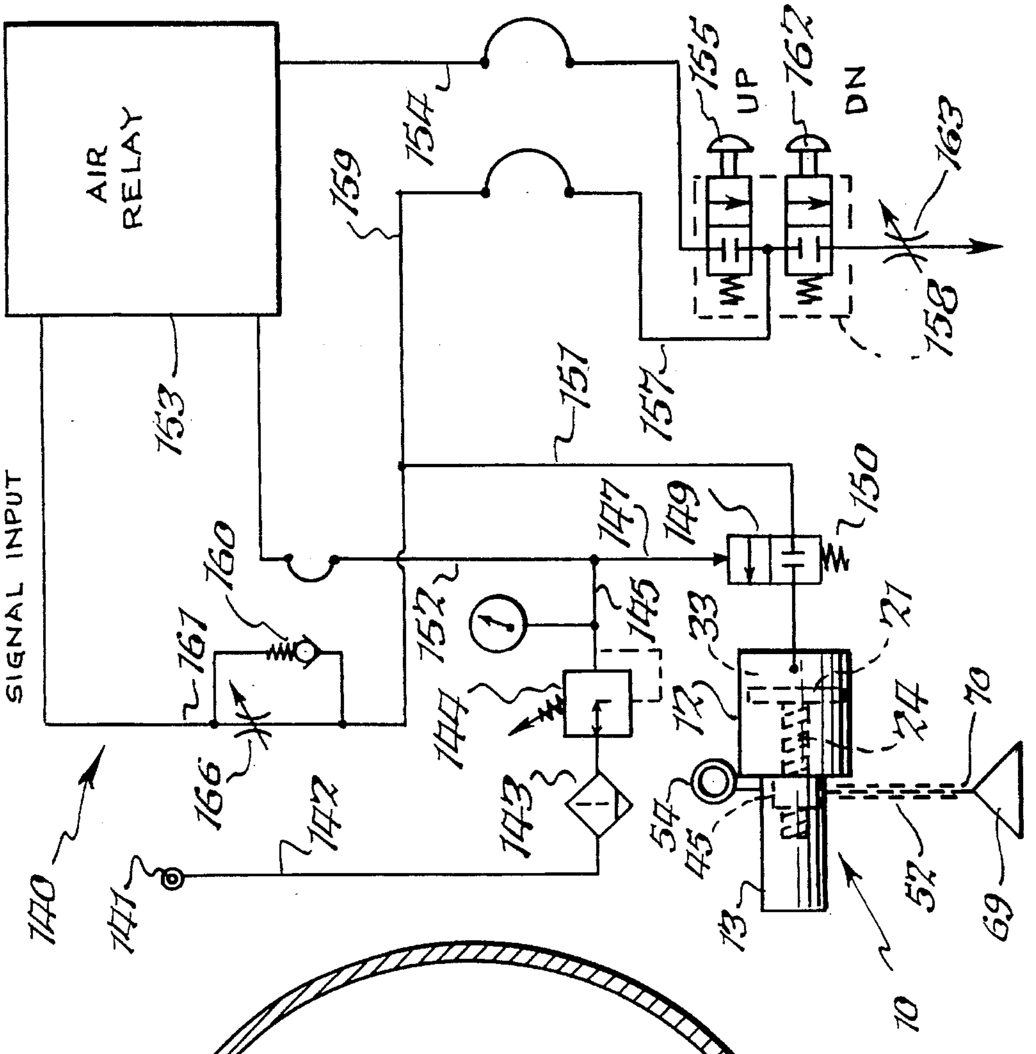
FIG. 9 is a schematic view of the pneumatic circuit for the air balancer.

In accordance with the second aspect of the present invention, a pneumatic control circuit 140 (FIG. 9) is provided to cause the rotational speed of the drum to remain at a substantially constant value regardless of variations in air pressure applied to the air balancer unit. In this respect, the load 69 will exert a downward force on chain 52 which in turn will exert a rotational force on the drum 45 which in turn will exert an axial force on ball screw 24 to tend to move piston 21 to the right (FIG. 9). In order to exert a lifting force on load 69, air pressure must be supplied to chamber 33 of cylinder 12 to force piston 21 to the left in opposition to the force exerted on the piston by the ball screw. This is accomplished in the following manner. A source of pressurized air 141 is provided which is conducted through conduit 142, filter 143, pressure regulating valve 144, conduit 145 and conduit 147 to valve 149 which is normally biased by spring 150 to a blocking position shown in the drawings. However, when air pressure is supplied to valve 149, it will be open to permit communication between conduit 151 and chamber 33. The purpose of valve 149 is to prevent downward falling of load 69 in the event there is a failure of the supplying of air pressure from the source because, in this instance, the valve 150 will be moved to its normally closed blocking position. The use of valve 149 is optional.

Conduit 145, which leads from the pressurized air source 141 is also in communication with conduit 152 which is the inlet conduit to air relay 153 which is a conventional valve structure, the function of which is to maintain a constant pressure in output line 154 thereof, during lifting, which is at a predetermined value, for example, 10 psi over the equivalent force per square inch on the side of piston 21 which is attached to ball screw 24. Thus, there will be an unbalancing force on piston 21 tending to move it to the left to lift load 69 and the force will be 10 psi times the area of the piston to provide a predetermined total force in excess of the effective force exerted by load 69 on the opposite side of piston 21. This loading by air pressure on piston 21 is maintained at an increment of 10 psi over the pressure per square inch applied on the opposite side of the piston regardless of any variations in air pressure. The net result is that the lifting speed of load 69 will remain substantially constant.

There are a number of conditions to which load 69 is subjected. The first condition is when load 69 is being lifted. To effect this, the up valve 155 of control valve 157 is moved to the open position. This permits flow of pressurized air through conduit 154, now open valve 155, conduits 158 and 159, conduit 151 and open valve 149 to cylinder chamber 33. Thus, pressurized air will be applied to piston 21 to effect lifting of the load. Flow from conduct 159 will also pass through check valve 160 into conduit 161 to the signal input of air relay 153. As noted above, the air relay will function to automatically cause the pressure in chamber 33 to be approximately 10 psi over the equivalent pressure applied to the opposite side of piston 21 by ball screw 24.

The second condition is when the lifted load 69 is maintained in a static balanced condition. This occurs when valve 155 is moved to the blocked position shown in the drawing. Thus, flow of pressurized air from conduit 154 to conduit 157 will be terminated, and since valve 155 shuts off this flow, air will be trapped in chamber 33 so as to maintain the piston 21 in a static position wherein the air pressure in chamber 33 balances the force exerted by load 69 on piston 21.

The third condition occurs when it is desired to lower the load 69. In this instance, down valve 162 is opened so that the force exerted by load 69 moving piston 24 to the right causes a reverse flow of air from chamber 33 through valve 149, conduit 151, conduit 159, conduit 157, now open down valve 162 and needle valve 163 to atmosphere. Needle valve 163 can be set to meter the air out of chamber 33 at a controlled rate to thereby cause the lowering of the load to occur at a rate which is dependent on the size of the load, that is, heavier loads will move downwardly at a slightly faster rate than ligher loads.

As noted above, the air relay 153 inherently functions to cause the air pressure in chamber 33 to produce a force on one side of piston 21 which is equivalent to a given value, for example, 10 psi over the equivalent pressure produced by load 69 on the opposite side of piston 21 from chamber 33 when the load 69 is being lifted. Conventional air relay valves of this type are known as a "Type 200, Model 200-CC" air relay manufactured by ControlAir, Inc. of Amherst, New Hampshire and as a "Type 20 Precision Air Relay" manufactured by Bellofram Corporation of Newell, West Virginia.

Figure 9A:
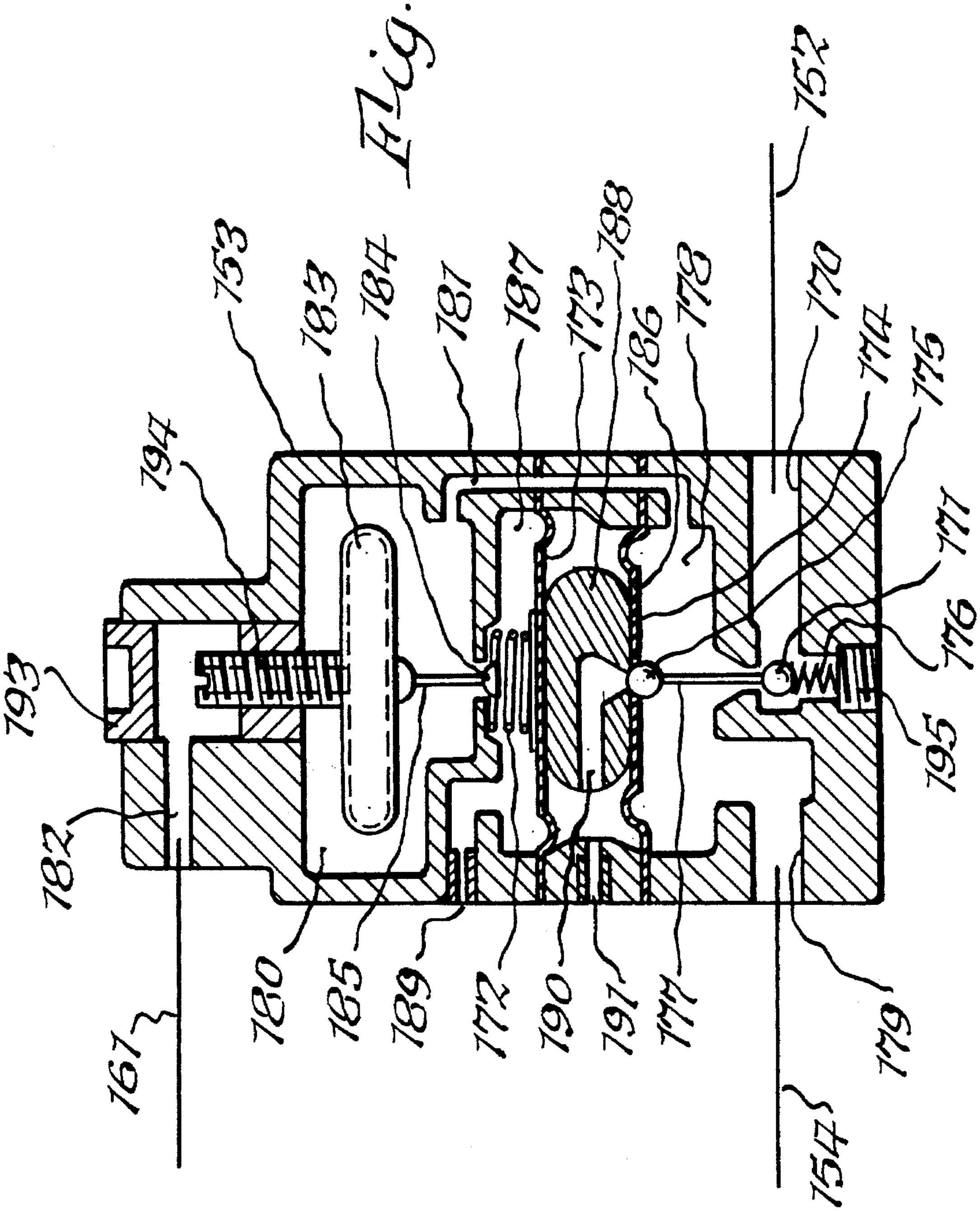
FIG. 9A is a schematic view of the air relay portion of the pneumatic circuit.
Figure 11:
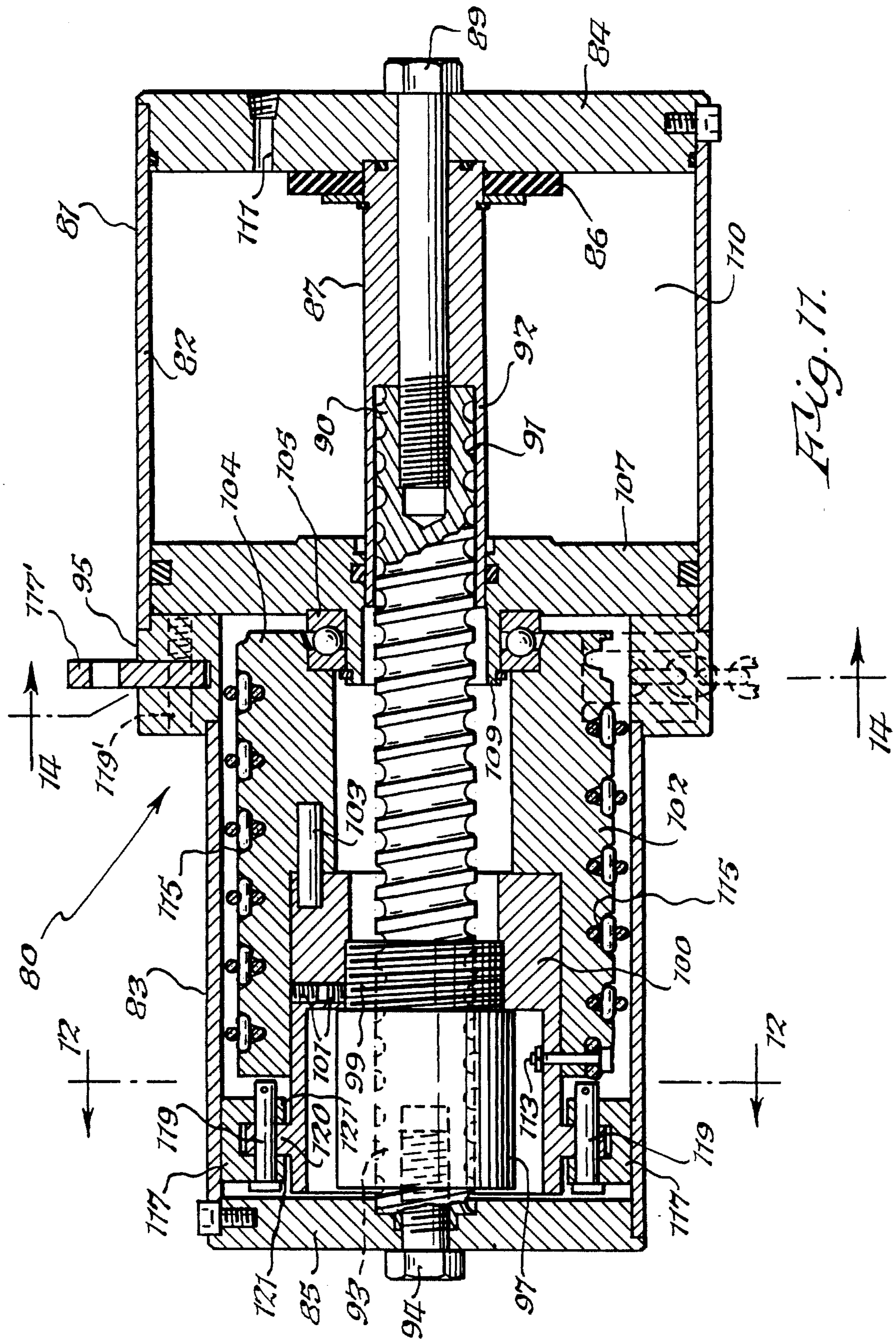
FIG. 11 is a cross sectional view similar to FIG. 1 but showing an alternate embodiment of the present invention.

The operation of the pneumatic circuit of FIG. 9 can better be understood by referring also to FIG. 9A which is a schematic view of the air relay 153 of FIG. 9. Broadly, the function of the air relay 153 is to provide an output pressure in outlet conduit 154 leading to cylinder chamber 33. This output pressure produces a force on piston 21 during lifting of load 69 which is a predetermined amount over the opposing force exerted by the ball screw 24 on piston 21. There are four operational conditions to be considered. The first condition is when there is no pressure in chamber 33, as when there is no load 69 on chain 52. The second condition is when the load 69 is being lifted by chain 52 by the application of pressurized air to chamber 33. The third condition is when the load 69 remains suspended by chain 52. The fourth condition is when the load 69 is being lowered by chain 52.

In the first condition when there is no load on chain 52, the supply air enters duct 170 of valve 153 from inlet conduit 152. Normally, supply valve 171 is biased slightly off of its seat by startup spring 172 which bears on the top of diaphragm assembly 186 which bears on closed relief valve 175, which acts through link 177 to unseat supply valve 171 against the bias of spring 176. Thus, source air from conduit 152 will pass through valve chamber 178 and enter duct 179 which leads to outlet conduit 154. If up valve 155 is closed, the compressed air will not pass beyond it. The pressure in chamber 178 will also be sensed in control chamber 180 in view of the fact that chamber 178 is in communication with control chamber 180 through valve conduit 181. While valve 155 remains closed and there is no load on chain 52, there will be a build-up of pressure in chamber 180, but there will be no pressure input to hermetically sealed measuring capsule 183 from conduit 161 through valve conduit 182. This pressure build up, while there is no pressure input to measuring capsule 183, will cause the measuring capsule, which is connected to pilot valve 184 by link 185 to cause pilot valve 184 to close because of the flexing of the wall of the measuring capsule 183 to which link 185 is connected. The flexing of this wall back and forth under different conditions causes the opening and closing of pilot valve 184. Thus, when pilot valve 184 is closed, any air pressure in pilot pressure chamber 187 will dissipate through bleed orifice 189. This will cause the diaphragm assembly 186, which consists of diaphragm support disc 188 sealed between pilot diaphragm 173 and control diaphragm 174, to rise which in turn moves the support disc 188 away from relief valve 175 to permit control chamber 180 to be vented through the bore 190 in diaphragm support disc 188 and exhaust vent 191. This will reduce the pressure in control chamber 180 which will cause the measuring capsule to move pilot valve 184 to an open position to increase the pressure in pilot pressure chamber 187 to move the diaphragm assembly 186 downwardly to bear on relief valve 175 to open supply valve 171. The valve 153 will continually cycle in the foregoing manner, and the pressure of the regulated air in duct 179 will be determined in part by the metering effect produced by supply valve 171 in conjunction with the bleeding through the pilot pressure chamber 187 and the flow through bore 190 and exhaust orifice 191, as described above. The resulting pressure in outlet duct 179 will be determined by the setting of the position of pilot valve 184, with the bias adjusting screw, as discussed more fully hereafter.

In the second condition, when it is desired to apply increased air pressure to piston 21 to raise chain 52, up valve 155 is opened to permit the regulated air from conduit 154 to enter cylinder chamber 33 through the above-described path. This air is at a relatively low pressure because of the fact that it is at a pressure which is only a given increment above the very low pressure in the measuring capsule, as determined by the cycling of the valve 153. The opening of valve 155 will momentarily create a pressure drop in valve chamber 178 and in control chamber 180, and there will be a pressure increase in conduit 161 and in measuring capsule 183, which is in communication with conduit 161 through a bore (not numbered) in adjusting screw 194. This will cause the measuring capsule 183 to move pilot valve 184 to a more open position which, in turn, will increase the pressure in pilot pressure chamber 187 which will move diaphragm assembly 186 downwardly. This will open the supply valve 171 to a greater extent to permit a pressure increase in valve chamber 178 and outlet conduit 154 which will in turn gradually supply increased pressure to cylinder chamber 33 to move piston 21 to the left to thereby raise load 69. The increased pressure of chamber 178 will also be communicated to control chamber 180 through valve conduit 181 which will provide increased pressure on the outside of measuring capsule 183 which, in turn, will tend to cause the measuring capsule to flex and move pilot valve 184 back toward its seat. Thus, valve 153 will cycle under these conditions to periodically adjust the pressure in control chamber 180 and pilot pressure chamber 187 to thereby cause an opening and closing movement of pilot valve 184 and a related opening and closing movement of supply valve 171 and relief valve 175. More specifically, if the pressure in control chamber 180 is high relative to the pressure in capsule 183, pilot valve 184 will close and the pressure in pilot pressure chamber 187 will bleed out and the relief valve 175 will open and supply valve 171 will close. Conversely, if the pressure in capsule 183 is high relative to the pressure in control chamber 180, the pilot valve will be unseated to raise the pressure in pilot chamber 187 which will move diaphragm assembly 186 downwardly to close relief valve 175 and open supply valve 171, to thereby raise the pressure in outlet duct 179 and conduit 154 leading to the cylinder chamber 33. Thus, the valve 153 will cycle to maintain the pressure to chamber 33 by an amount which is determined by the setting of the bias adjusting screw 194 which determines the position of pilot valve 184 relative to its seat on valve portion 172., More specifically, as noted above, pilot valve 184 is connected to the wall of control chamber 183 by link 185, and the axial movement of bias adjusting screw will determine the position which pilot valve 184 has relative to its seat. Thus, the differential between the pressures in control chamber 180 and in measuring capsule 183 and the position of pilot valve 184 will determine the opening and closing positions of pilot valve 184 to in turn determine the pressure of the air supplied to conduit 154 leading to chamber 33 as compared to the pressure of the air supplied to measuring capsule 183.

During lifting of the load, check valve 160 and needle valve 166 cause the piston 21 to have a soft start and to move smoothly. In this respect, before piston 21 moves, there will be a build-up of pressure in conduit 159, and this increased pressure is immediately sensed in measuring capsule 183 because of the flow through check valve 160, which results in producing an increased pressure in conduit 154. As piston 21 starts to move, there will be a drop in pressure in conduits 151 and 159 as the volume of chamber 33 increases. This drop in pressure cannot be immediately communicated to measuring capsule 183, which is now at a higher pressure, because check valve 160 in conduit 161 will close. Needle valve 166 will restrict the flow of air out of measuring capsule 183 toward conduit 159 at a controlled rate as the volume of chamber 33 increases and the pressure in chamber 33 and in conduit 159 drops, to thereby cause the piston 21 to have a soft start and to move to the left more smoothly than if the needle valve 166 was not present. Also the speed of piston 21 will be faster because of the above-mentioned increased pressure relationship in conduits 154 and 159. This action is experienced continually as the volume of chamber 33 continues to increase during lifting of load 69 so that piston 21 will continue to move smoothly to the left as long as compressed air is supplied to chamber 33. It is especially noted that the signal received by valve 153 is obtained from conduit 159 which is at a slightly higher pressure than chamber 33 as piston 21 moves to the left. This results in supplying a higher pressure to conduit 159 which produces a faster lifting speed than if the pressure was obtained from chamber 33.

The value of the pressurized air supplied to chamber 33 will depend on the size of the load 69. In other words, the parameters of the mechanical and pneumatic systems are such that when there is a particular load tending to provide an effective force on piston 21 moving it to the right, this will cause a pressure to be applied to the air in chamber 33 which is communicated through conduits 151 and 161 to the signal input conduit 182. The larger the load, the greater will be the air pressure force applied as a signal, and the smaller the load, the smaller will be the force applied as a signal. Thus, the pilot valve 184 is set by the bias adjusting screw 194 to provide pressurized air to outlet conduit 154 at a given increment over the force applied to the piston by the load which is translated into the air pressure supplied to measuring capsule 183.

The third condition of maintaining a load suspended is effected in the following manner. After the load 69 has been lifted to the desired extent, the up valve 155 is moved to its blocking position wherein the regulated air output in conduit 154 can no longer enter conduit 159 leading to cylinder chamber 33 and signal input conduit 161. Furthermore, the air in cylinder chamber 33 will be blocked because it cannot escape through conduits 151, 159 and 161. Therefore piston 21 will be held in a static position. However, source air will still communicate with air relay 153 through conduit 152. The relatively high air pressure in cylinder chamber 33 will still be communicated to measuring capsule 183 through conduits 151 and 161. A condition will be reached wherein there is stabilization within the valve 153 at a pressure in excess of the pressure in measuring capsule 183 because the air pressure within the measuring capsule 183 will stabilize at a predetermined value due to cycling, as explained above. However, this increased pressure leading to conduit 154 will not go beyond up valve 155 because the latter is blocked.

The fourth condition which occurs relative to air relay 153 is when the load 69 is being lowered. This occurs when down valve 162 of valve 158 is actuated to permit venting of cylinder chamber 33 to the atmosphere through the above-described path, namely, conduits 151 and 159 and needle valve 163, which sets the maximum down speed of a maximum load. The location of valve 163 beyond valve 162 provides more accurate control and lesser capacitative delays for any weight load than if it was positioned in conduit 159. However, at this time there is a tendency for pressure in cylinder chamber 33 to lessen because it is vented to the atmosphere, and this lessened pressure is communicated as a signal through conduits 151 and 161 to control valve conduit 182 and measuring capsule 183. The lessening of pressure within measuring capsule 183 while the supply pressure remains relatively high in valve chambers 178 and 180, will cause pilot valve 184 to rise to lessen the pressure in pilot pressure chamber 187 which, in turn, causes the diaphragm assembly 186 to rise, which opens relief valve 175 and causes supply valve 171 under the bias of spring 176 to close thereby effecting dissipation of the pressurized air in chamber 178 through valve conduit 190 and exhaust vent 191. Thus, there will be a dropping of air pressure in both the measuring capsule and control chamber until the situation is stabilized wherein pilot valve 184 returns to its normally set slightly cracked open position. At this point it is to be noted that supply valve 171 and relief valve 175 occupy the following relationship relative to each other. When supply valve 171 is open, relief valve 175 must be closed and vice versa.

After load 69 has been removed from chain 52, as by being set on a supporting surface, there will no longer be a force applied to ball screw 24 tending to move piston 21 to the right, which, in turn, terminates a force from piston 21 onto the air in cylinder chamber 33, and thus this totally reduced pressure is communicated to measuring capsule 183. This causes pilot valve 184 to be in its normally open position, and spring 172 will return supply valve 171 to a slightly cracked position wherein supply air can move into chamber 178, chamber 180 and duct 154. However, such pressurized air cannot reach cylinder chamber 33 because up valve 155 is closed. Furthermore, since no compressed air is now being supplied to the signal input conduit 161, a stabilized condition will be reached within air relay 153 until the up valve 155 is again opened to function in the above-described manner.

The bias of the pilot valve 184 is set by removing pipe plug 193 and adjusting screw 194. Also, the adjustment of pipe plug 195, which bears on spring 176 will adjust the relative forces applied to the opposite sides of diaphragms 173 and 174 by springs 172 and 176.

It will be understood that the above explanation of the operation of the air relay 153 has been given to provide an amplified description of how the pneumatic circuit operates. However, as noted above, the air relay valve 153 is a conventional well-known commercial valve which is obtainable from a plurality of sources to provide a pressurized air output which is at a predetermined increment higher than the pressure input thereto. However, insofar as known in conventional practice, the signal pressure to the measuring capsule is from a source which is not connected to the area to which the operating pressure is supplied. In the present case, it is believed that the air relay 153 is being used in an entirely different and unique manner in that the area to which pressure is being supplied also provides the signal to the air relay for controlling the pressure to the area which is being supplied.

In the above description, the up valve 155 has been considered in a fully open position, and in this instance a maximum drum speed will be obtained. However, it will be appreciated that valve 155 can be throttled to vary the air flow to conduit 159 to cause the piston 21 to move at less than maximum speeds, at the selection of the operator. The throttling will produce less than maximum pressures in chamber 33. It will be appreciated, however, that at any given throttled setting, the piston speed will remain constant. In this respect, it will be understood that different size loads travel at different speeds, but the particular speed at which a load is traveling will remain substantially constant regardless of variations in air pressure because of the operation of the pneumatic circuit.

The above-described pneumatic circuit not only makes the unit operate within a lesser range of speeds throughout the range of loads applied thereto between no load and full load but also allows the braking device to be used effectively because by causing the pressures applied to each load to remain substantially constant, accelerations of the piston which may occur due to high variations in pressure are prevented so that the brakes will not have to come into play as a result of such variations.

In actual practice utilizing the above-described pneumatic circuit, the following data was obtained when a 100 pound load was lifted by an air balancer having a 50 square inch piston at different applied pressures:

| Pressure in PSI | Lift time for 76 inches of travel |
|---|---|
| 105 | 6.17 seconds |
| 95 | 6.23 seconds |
| 85 | 6.25 seconds |
| 75 | 6.22 seconds |
| 65 | 6.82 seconds |

The following data was obtained for lifting only a chain with an empty hook:

| Pressure in PSI | Lift time for 82 inches of travel |
|---|---|
| 36 | 2.37 seconds |
| 117 | 2.32 seconds |

The foregoing data shows that for a given load, different pressures will cause the load to be lifted at a substantially constant speed.

While preferred embodiments of the present invention have been disclosed, it will be appreciated that it is not limited thereto but can be otherwise embodied within the scope of the following claims.

What is claimed is:

1. An air lifting and balancing unit comprising a cylinder, a piston in said cylinder, a ball screw affixed to said piston, a ball nut, means mounting said ball nut for rotation on said ball screw, and drum means mounted on said ball nut for moving an elongated member which carries a load.

2. An air lifting and balancing unit as set forth in claim 1 wherein said drum means is a pocket wheel, and wherein said elongated member is a chain.

3. An air lifting and balancing unit comprising a housing, a cylinder mounted relative to said housing, a piston in said cylinder, a ball screw affixed to said piston for axial movement with said piston, a ball nut mounted on said housing against axial movement and threadably engaging said ball screw for rotation thereby as said ball screw moves axially therethrough, and a drum mounted on said ball nut for rotation therewith.

4. An air lifting and balancing unit as set forth in claim 3 wherein said drum is a pocket wheel, and an elongated member mounted on said drum for carrying a load.

5. An air lifting and balancing unit as set forth in claim 3 wherein said ball nut is mounted on bearings located on opposite sides thereof.

6. An air lifting and balancing unit as set forth in claim 3 wherein said ball nut and drum are mounted at the end of said cylinder.

7. An air lifting and balancing unit as set forth in claim 6 wherein said ball screw has first and second ends, and wherein said first end is affixed to said piston, and an anti-rotation mechanism is affixed to said second end of said ball screw.

8. An air lifting and balancing unit as set forth in claim 7 wherein said anti-rotation mechanism comprises a bar affixed to said second end of said ball screw and extending transversely thereto, outer ends on said bar, rollers mounted on said outer ends of said bar, and rods extending longitudinally of said ball screw for engagement by said rollers.

9. An air lifting and balancing unit comprising a housing, a cylinder in said housing, a drum casing coupled to said cylinder, and an anti-rotation tube coupled to said drum casing, a piston in said cylinder, a ball screw having a first end coupled to said piston and a second end located in said anti-rotation tube, a ball nut mounted against axial movement in said drum casing for receiving said ball screw between said first and second ends thereof, and anti-rotation means coupled to said second end of said ball screw in said anti-rotation tube for preventing rotation of said ball screw as it moves axially through said ball nut which is held against axial movement in said drum cage whereby said ball screw and said drum mounted thereon are caused to rotate.

10. An air lifting and balancing unit as set forth in claim 9 wherein said drum is a pocket wheel.

* * * * *

UNITED STATES PATENT AND TRADEMARK OFFICE

CERTIFICATE OF CORRECTION

PATENT NO. : 5,556,077
DATED : September 17, 1996
INVENTOR(S) : Thomas A. Mefferd et al It is certified that error appears in the above-indentified patent and that said Letters Patent is hereby corrected as shown below:

On the Title page, item [75] should read:

--[75] Inventors: Thomas A. Mefferd, Murrells Inlet, S.C.;
Michael D. Olson, Laurens, Iowa--

Column 1, line 29, change "balance" to --balancer--.

Column 2, line 36, change "foe" to --for--.

Column 5, line 18, change "68" " to --68'--.

Column 6, line 43, change "117" " to --117'--;
line 44, change "119" " to --119'--;
line 57, change "68" " to --68'--.

Signed and Sealed this

Twenty-seventh Day of May, 1997

Attest:

Bruce Lehman

BRUCE LEHMAN

*Attesting Officer*

*Commissioner of Patents and Trademarks*